N. P. Aiken.

Stop for Knitting Mach.

No. 709. Reissued May 3, 1859.

UNITED STATES PATENT OFFICE.

NELSON P. AIKIN, OF TROY, NEW YORK.

IMPROVEMENT IN KNITTING-MACHINES.

Specification forming part of Letters Patent No. 20,854, dated July 13, 1858; Reissue No. 709, dated May 3, 1859.

*To all whom it may concern:*

Be it known that I, NELSON P. AIKIN, of the city of Troy, in the county of Rensselaer and State of New York, have invented a new and useful improvement in knitting-machines for the purpose of stopping the machine whenever the yarn accumulates in its needles, and thereby preventing the breaking of the needles and the consequent waste and delay; and I do hereby declare that the following is a full and exact description of the same, reference being had to the annexed drawings, making a part of this specification, in which—

Figure 1:
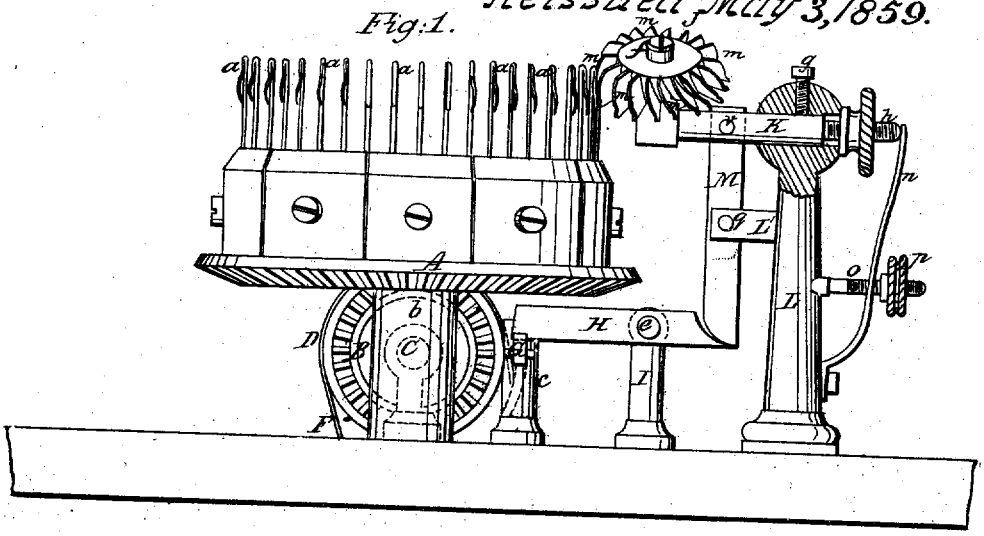
Figure 2:
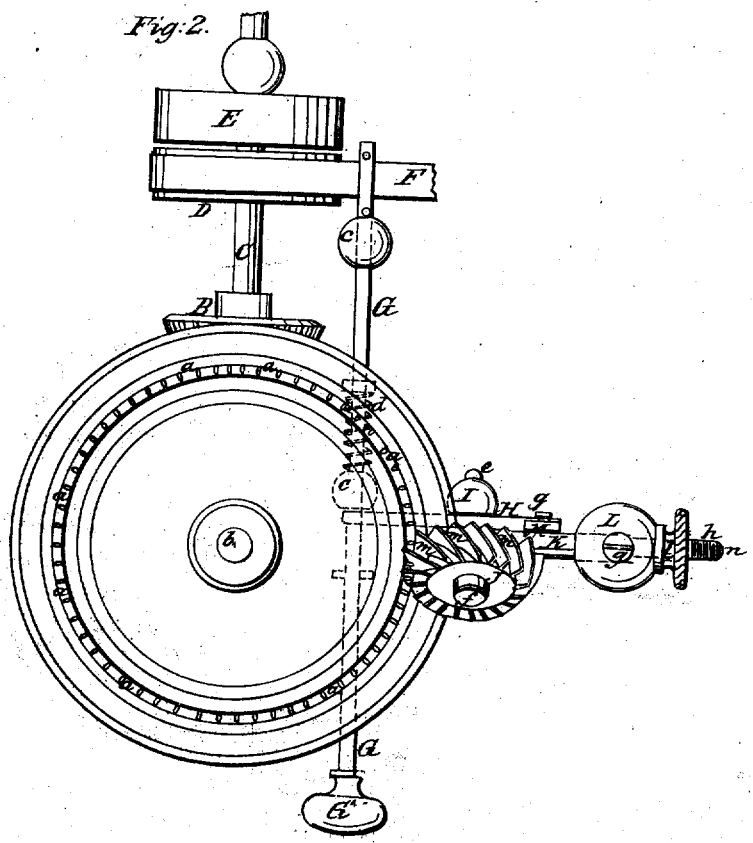

Figure 1 is an elevation, and Fig. 2 a plan, of a portion of a knitting-machine with my improvement applied thereto.

The same letters refer to like parts in both figures.

In some knitting machines heretofore made the belt-shipper, or other mechanical contrivance by which the motion of the machine is stopped, is so connected with the yarn as it runs to the needles that whenever the yarn breaks or fails the machine will be stopped, by reason of the breaking or running out of the yarn; and in the same or in other knitting-machines the mechanical device by which the motion of the machine is stopped is so connected with the web or knit fabric as it leaves the needles that whenever there is a hole in the web at or near the needles the machine will then be stopped by reason of the hole in the web acting on the stopping mechanism. An example of each of those cases is shown in Robert Cushman's United States patent of May 22, 1855. But it often occurs, in using knitting-machines, that while the feed-yarn and the knit fabric are both entire the yarn then accumulates in the needles so as to cause the breaking or smashing of the needles, and consequently much waste and delay, the accumulation of the yarn in such cases being owing to knots or to kinks in the yarn, or to some of the needles becoming bent, or to the presser, cast-off wheels, or other knitting appliances being displaced, or to the take-up mechanism being defective, or to two or more of these causes combined. To remedy that defect, and also stop the machine whenever the yarn accumulates upon the needles by reason of there being so large a hole made, or so many stitches dropped that the hole will not knit up, or by reason of the running off of the web when a single feed-yarn breaks in such machines as have more than one feed, I make the motion of the knitting-machine depend upon the absence of accumulated yarn in the needles, in contradistinction from making the motion of the machine depend upon the continuity of the yarn where it runs into the needles or upon the wholeness of the knit fabric as it leaves the needles; and my invention consists in so arranging whatever mechanical contrivance is employed to stop a knitting-machine in relation to the needles of the machine that whenever the yarn accumulates in the needles so as to endanger the latter, or so that the yarn will not be cast off from the needles, the accumulated yarn in the needles will then so press against or come in contact with and move or set in action the stopping mechanism as to cause the latter to stop the machine, and thus prevent the breaking of the needles.

My improvement is applicable to various kinds of "circular" and of "straight" knitting frames or machines, which will necessarily require differently formed apparatus; but as it is impracticable to set forth in this specification every form that circumstances may render suitable, I have, by way of elucidation, merely exhibited one construction in the annexed drawings, which, with the description herein given, will enable any competent machinist to readily apply my invention to the various knitting-machines to which it is applicable.

In the annexed drawings, the needles *a a* are attached to a horizontal bevel-gear, A, which derives motion on an upright shaft, *b*, from a bevel-gear, B, on a horizontal driving-shaft, C.

D is a driving-pulley fast on the shaft C, and E is a loose-pulley on the same shaft.

F is a driving belt.

G is a belt-shipper fitted to slide horizontally in two guides, *c c*, and having a spring, *d*, applied to it in such a manner as to exert a tendency to ship the belt onto the loose-pulley E.

H is a lever arranged at right angles to the belt-shipper on a fulcrum, *e*, which is secured in a post, I. One arm of this lever, which is longer and heavier than the other one, stands over the belt-shipper, and when the belt is on the fast pulley D the said arm drops into a notch in the top of the belt-shipper, and thus acts as a stop to lock the shipper.

J is a toothed wheel, the teeth or blades *m m* of which gear with or enter between the needles at or near their ends, where the yarn accumulates, so that the said wheel is turned around by the needles, and so that whenever the yarn lodges in the needles the ends of the teeth *m m* will then press against and the wheel J be forced outward by the accumulated yarn where it extends from needle to needle. The wheel J may be and I generally prefer to have it serve as the "sinker-wheel," which feeds the yarn into the needles. The wheel J turns on a pin, *f*, which is secured to one end of a horizontal bar, K, that is fitted to slide longitudinally in a standard, L, but is prevented from turning therein by a screw-pin, *g*, whose point enters a groove in the said bar. The position of the bar K is radial, or nearly so, to the circle of needles. At the opposite end of the bar K to the wheel J there is screw-thread *h*, cut on the said bar, and to this screw-thread is fitted a nut, *l*, which acts as a stop to prevent the blades *m m* from being held too deeply between the needles by a spring, *n*, which is applied to the bar K to force the latter toward the circle of needles. The pressure of the spring *n* is only sufficient to keep the wheel J to its work or in place while the knitting proceeds properly, and this pressure is, or may be, graduated by the use of a screw, *o*, and nut *p*, the former of which is secured firmly to the standard L.

M is a lever, whose fulcrum is a pin, *q*, in a fixed arm, L′, of the standard L. The upper end of this lever is connected by a pin, *r*, with the sliding bar K, and the lower end is fitted to the end of the short arm of the lever H.

Whenever the yarn accumulates in the hooks of the needles in knitting, the wheel J, with the bar K, will be forced outward by the accumulated yarn in the needles, and will move the lever M so as to make its lower end depress the short end of the lever H, so as to raise its other end from the notch in the belt-shipper G, and thus liberate the latter, so as to allow the spring *d* to move the belt-shipper so as to carry the belt F onto the loose pulley and stop the machine.

It is obvious that various other devices than the levers M and H may be employed to connect the wheel J or its substitute with the belt-shipper or its equivalent, and that various forms of stopping apparatus other than the belt-shipper may be used; and, since the accumulated yarn projects outward beyond the needles, it is obvious that the accumulated yarn may be made to stop the machine by having the wheel J, or a finger, or any other suitable device or surface set out from the needles so that it will not be touched or moved by the needles nor by the yarn while the knitting goes on properly, but so arranged that whenever the yarn accumulates in the needles the accumulated yarn will then come in contact with and turn or move the wheel J or its substitute, so as to move or set in action the belt-shipper or other stopping mechanism and stop the machine; but such changes are but mere modifications in construction, such as would readily occur to any competent machinist, for the distinguishing feature of my invention is the stopping of the machine by the action of accumulated yarn in its needles.

What I claim as my invention, and desire to secure by Letters Patent, is—

Stopping a knitting machine, when the yarn accumulates in its needles, by the action of the accumulated yarn, substantially as herein set forth.

NELSON P. AIKIN.

Witnesses:
THOS. J. CORNELIUS,
AUSTIN F. PARK.